No. 624,534. Patented May 9, 1899.
C. K. PEVEY.
NOSE GUARD FOR EYEGLASSES.
(Application filed May 9, 1898.)
(No Model.)
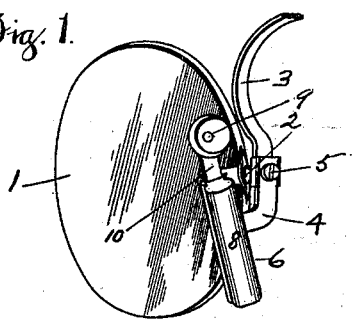
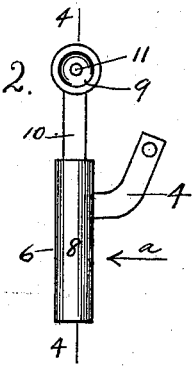
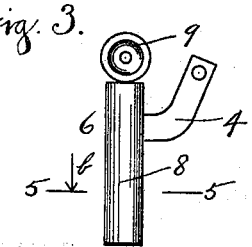
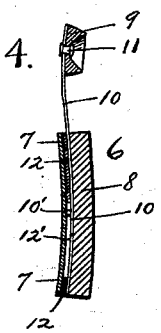
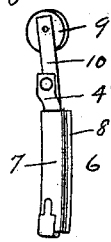
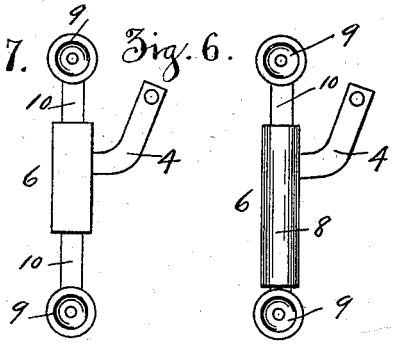
Witnesses
S. A. Kinsley
M. J. Galvin
Inventor
Charles K. Pevey
By his Attorney
J. C. Dewey
THE NORRIS PETERS CO., PHOTO-LITHO., WASHINGTON, D. C.

UNITED STATES PATENT OFFICE.

CHARLES K. PEVEY, OF WORCESTER, MASSACHUSETTS.

NOSE-GUARD FOR EYEGLASSES.

SPECIFICATION forming part of Letters Patent No. 624,534, dated May 9, 1899.

Application filed May 9, 1898. Serial No. 680,096. (No model.)

*To all whom it may concern:*

Be it known that I, CHARLES K. PEVEY, a citizen of the United States, residing at Worcester, in the county of Worcester and State of Massachusetts, have invented certain new and useful Improvements in Nose-Guards for Eyeglasses, of which the following is a specification.

My invention relates to nose-guards for eyeglasses; and the object of my invention is to make an improved nose-guard, and more particularly to make a nose-guard in which the length of the guard or the distance between the upper and lower ends of the guard is not fixed, as in the ordinary construction of nose-guards, but is variable.

My invention consists in certain novel features of construction of my nose-guard, and more particularly in making a nose-guard of what may be termed "telescopic construction"—that is, with one part adapted to telescope or move into and out of another part to vary the distance between the upper and lower ends of the guard, as will be hereinafter fully described.

I have found in practice that while the lower part of nose-guards for eyeglasses will ordinarily bear on the right part of the nose to properly grip it the upper part or end does not, and consequently there is a tendency all the time for the glasses to tilt forward or move away from the upper part of the nose. In order to prevent this forward tilting of the eyeglasses, it is necessary that the upper end of the nose-guards shall extend well up on the nose and even back of the protruding flesh at the upper part of the nose between the eyes, so that the flesh will extend in front of the upper ends of the nose-guards when the nose-guards are in their proper position. The exact position of the upper end of the nose-guard to properly hold the eyeglasses will vary with different persons, and therefore I have made the upper part or end of the nose-guard extensible in the direction of the length of the bearing-surface of the nose-guard. By this construction I am enabled to make the upper end of the nose-guard engage the nose or the flesh above the same at the right point to prevent any forward tilting of the glasses.

Referring to the drawings, Figure 1 is a perspective view, on an enlarged scale, of one-half of a pair of eyeglasses provided with my improved nose-guard. Fig. 2 is a front view of the nose-guard detached. Fig. 3 corresponds to Fig. 2, but shows the upper part of the guard in its lowest position. Fig. 4 is a central longitudinal section on line 4 4, Fig. 2, looking in the direction of arrow $a$, same figure. Fig. 5 is a cross-section on line 5 5, Fig. 3, looking in the direction of arrow $b$, same figure. Fig. 6 shows a modified construction of my nose-guard with two extension parts. Fig. 7 shows another modified construction of my nose-guard, in which the main part does not have the pad or cushion surface shown in Fig. 6; and Fig. 8 shows a rear perspective view of another modified construction, in which the guard does not have the offset attaching-arm shown in the other figures.

In the accompanying drawings, 1 is the lens, 2 the post secured thereto, and 3 the spring, all of any ordinary construction.

The nose-guard of my improved construction preferably has the attaching-arm 4, which is secured to the post 2 by a screw 5 in the ordinary way. The arm 4 may be made of the ordinary shape and separate from or integral with the metal back of the main or stationary part of the nose-guard, as desired.

The main part 6 of the nose-guard, to which the arm 4 is attached, is preferably of the usual elongated shape of ordinary nose-guards, and in this instance consists of the metal back 7, which has its longitudinal edges bent over in the usual way to secure thereto the pad or surface 8, which is preferably used.

Combined with the main part 6 of the nose-guard is the extensible part 9, which is preferably located over and in line with the upper end of the main part 6, as shown in Figs. 1 to 4, inclusive. The part 9 is adapted to be moved toward and away from the upper end of the main part 6 in alinement with said part and to remain at any point intermediate its two extreme positions. (Shown in Figs. 2 and 3.)

I preferably connect the extensible part 9 with the main part 6 of the guard by a thin metal strip 10, which is secured at one end by a rivet 11 or otherwise to the extensible part 9, which may be made of cork or other suitable material and of circular shape, as shown, or of square, oblong, or other shape, if desired. The other end of the connecting-strip 10 is adapted to slide or telescope into the main part 6 of the guard.

In the construction shown in the drawings there is a thin metal strip 12 extending upon the inner surface of the metal back 7 of the main part 6 of the guard. This strip 12 has an elongated slot 12' therein, and into this extends, to move up and down therein, a pin 10' on the strip 10. (See Fig. 4.) The strip 10 extends between the strip 12 and the back of the pad 8. The pin 10' on the strip 10 moves in the slot 12' in the strip 12 and acts as a stop to limit the outward and inward motion of the part 9 by engaging with the ends of said slot 12', and the friction between the parts is sufficient to cause the part 9 to remain in its adjusted position.

In Fig. 6 is shown a modified construction of my nose-guard, in which are two extensible parts 9, one at the upper and one at the lower end of the main part 6 of the nose-guard. The main part 6 is in this instance provided with the pad or cushion surface 8.

In Fig. 7 is shown another modified construction of my nose-guard, in which the main part 6 of the guard is not provided with the pad or cushion surface 8 shown in Fig. 6. The part 6 may be made as a flattened tube, corresponding to what is shown in Fig. 5, into which the strips 10, carrying the parts 9, telescope. The extensible parts 9 in this instance are the only parts which act as bearing-surfaces to hold the eyeglasses on the nose, and their relative position may be adjusted as desired.

In Fig. 8 is shown another modified construction of my nose-guard, in which a straight nose-guard is shown without the side attaching-arm 4. The guard is provided with an extension 4' at the upper end of the main part of the guard, by which it is attached to the post or frame with a screw.

It will be understood that the details of construction of my nose-guard may be varied from what is shown in the drawings and above described, if desired, without departing from the principle of my invention.

Having thus described my invention, what I claim as new, and desire to secure by Letters Patent, is—

In a nose-guard for eyeglasses, &c., the combination with the main part, of an extensible part telescoping into the main part, substantially as shown and described.

CHAS. K. PEVEY.

Witnesses:
J. C. DEWEY,
M. J. GALVIN.